United States Patent [19]

Smith et al.

[11] Patent Number: 4,862,316

[45] Date of Patent: Aug. 29, 1989

[54] STATIC CHARGE DISSIPATING HOUSING FOR METAL DETECTOR SEARCH LOOP ASSEMBLY

[75] Inventors: Peter T. Smith, Sweet Home; Mark W. Rohde, Scio; Donald K. Shoemaker, Sweet Home, all of Oreg.

[73] Assignee: White's Electronics, Inc., Sweet Home, Oreg.

[21] Appl. No.: 162,183

[22] Filed: Feb. 29, 1988

[51] Int. Cl.$^4$ ............................................. H05F 3/02
[52] U.S. Cl. .................................. 361/220; 336/84 C
[58] Field of Search ............... 361/215, 219, 212, 220; 174/50, 52 R, 35 MR; 336/84 C; 324/329

[56] References Cited

U.S. PATENT DOCUMENTS

| | | | |
|---|---|---|---|
| 3,583,930 | 6/1971 | Ehrreich et al. | 174/35 MS X |
| 3,753,185 | 8/1973 | Mahan | 336/84 |
| 3,907,955 | 9/1975 | Viennot | 361/215 X |
| 4,330,811 | 5/1982 | Bordner | 361/212 |
| 4,664,971 | 5/1987 | Soens | 174/35 MS X |
| 4,682,958 | 7/1987 | Slavik et al. | 434/355 |

OTHER PUBLICATIONS

IBM Technical Disclosure Bulletin vol. 19, No. 7, Dec. 1976, Entitled "Electroconductive Polymers For Electromagnetic Compatibility".

Primary Examiner—L. T. Hix
Assistant Examiner—Brian W. Brown
Attorney, Agent, or Firm—Chernoff, Vilhauer, McClung & Stenzel

[57] ABSTRACT

A housing for the magnetic induction coils of the search loop assembly of a metal detector is constructed of plastic resin reinforced with non-metallic electrically conductive graphite fibers, and is connected to ground potential of the main electronics package of the metal detector so that the housing acts as a static-draining shield for the search loop assembly. The mixture of graphite fibers and plastic conducts electricity well enough to prevent accumulation of static electricity charges and makes the housing stronger and more abrasion resistant than similar housings of non-reinforced plastic. The housing may be molded as two halves to include a central aperture, to allow the user of the metal detector to see the precise location on the ground at which to dig for detected targets. Upstanding walls concentric with the perimeter of the housing may be included in one half of the housing, to be used as spools for transmit, receive and balance coils wound directly onto these spools, simplifying the manufacture of a search loop assembly. Polyurethane foam is expanded in place in a cavity defined in the interior of the housing, further strengthening the search loop assembly. The density of the foam may be chosen to result in a search loop assembly having neutral buoyancy in fresh or sea water.

12 Claims, 1 Drawing Sheet

STATIC CHARGE DISSIPATING HOUSING FOR METAL DETECTOR SEARCH LOOP ASSEMBLY

BACKGROUND OF THE INVENTION

The present invention pertains to a search loop assembly for a hand-held metal detector. More specifically, it pertains to a housing portion of the search loop assembly, containing the search loop coils, and to prevention of the development of significant electrostatic charges on the housing.

A transmit coil in a search loop assembly of a hand-held metal detector is driven electrically to generate a periodically changing magnetic field. A receive coil, also in the search loop assembly, detects changes in the magnetic field so generated; these changes may indicate the presence of desirable metallic objects within the magnetic field.

To avoid extraneous disturbance of the magnetic fields surrounding the receive and transmit coils of such loop assemblies, housings for them have previously been constructed of nonconductive plastics. A plastic search loop housing, however, can accumulate an electrostatic charge, as when brushed over grass or sand during use of a metal detector. The irregular discharge of such charges can mask changes in the magnetic field resulting from desirable target materials, making it difficult to use the metal detector reliably.

The problem of static electric charge buildup in such plastic housings has been solved by providing a path for conduction of electricity, which is associated with the housing and is connected to a ground or common potential so as to conduct electrical charges away from the search loop housing. A Faraday shield of metallic conductors would cause an undesired effect on the performance of a metal detector. In the past, therefore, static charge drainage for metal detector search loop assemblies has been provided by spraying the interior of a plastic housing with a layer of a non-metallic conductive material, such as C3010 external black conductive coating available from Pierce & Steven Chemical Corp. of Buffalo, N.Y. Such a coating forms an electrically conductive layer having some electrical resistance, which is desirable, since a certain amount of resistance apparently prevents generation of eddy currents in the coating which can adversely affect the way the receive coil "sees" the area being searched. Such a sprayed-on layer of electrically conductive material, however, may later crack and peel, diminishing its beneficial effects as a drain for static charges. Also, spraying such material onto the housing adds costly labor to the manufacture of search loop assemblies.

The use of various electrically conductive materials to form shields for electronic equipment is known. For example, use of metal sheets or foils, or plastic material filled with metallic conductors such as metal-coated glass fibers is known for electrostatic or electromagnetic shielding in some applications. However, such materials, since they contain metal, would distort magnetic fields of the types used by metal detectors, leaving those materials useless for the present purpose. So long as metallic particles do not touch one another within the housing material, no static discharge drainage is provided, but the material of such a housing will affect the magnetic field, appearing to the metal detector as a large metallic target.

Carbon is another conductive material that is known as a filler, in the form of fibers, for making plastic materials electrically conductive for sue as shields, as disclosed in Soens U.S. Pat. No. 4,664,971. Carbon in the amorphous state, in the form of relatively short fibers sometimes called electrical grade carbon, can be added to plastic. Such carbon fiber-filled plastics are commercially available and are recommended for shielding against electromagnetic interference. Unfortunately, when plastic containing such carbon fibers in low concentrations is molded the carbon fiber material tends to agglomerate into isolated groups, lacking uniform distribution and predictable conductivity. The groups of carbon particles, furthermore, are detrimental to metal detector performance. Increasing the concentration of such electrical grade carbon as a filler in a plastic, to a high enough concentration that the carbon groups interconnect reliably, results in a plastic material having such a high conductivity that eddy currents can be generated in the housing. Such plastic material filled with carbon also does not perform structurally as well as desired for construction of a search loop housing not susceptible to static electric charge accumulations.

In a metal detector search loop assembly the transmit coil, receive coil, and a feedback coil must be maintained in a fixed spatial arrangement with one another and with respect to a static shield. A low resistance static shield causes an offset of the effect of the driven coils' field on the receive coil of a metal detector, by comparison with the absence of a static charge-dissipating or Faraday shield. Changes occurring in this spatial arrangement during metal detector use can cause deceptive signals to be generated in the receive coil.

Because of the usual attachment of a handle to a search loop assembly, the mechanical forces applied to the housing during use of a metal detector could easily cause distortion of a light, flexible, plastic housing and relative movement of the coils carried in the housing and of a conductive coating used to conduct electricity to eliminate static charge accumulations. Any such movement can cause aberrations of the signals produced in the receive coil of the metal detector and thus could lead to misinterpreted signals. Previously known search loop assembly construction techniques have solved this problem with varying degrees of success. One solution is to make a housing of thicker plastic, thus making the housing more rigid. Unfortunately, a housing of thicker material also is heavier, which is undesirable in a metal detector for hand-held use. Another solution is to support the coils on a separate circular base of foam plastic which contacts the plastic housing only at the base's perimeter. In this type of structure a flexing housing is less likely to change the spatial relationships among the coils. Use of such a separate base for supporting the coils, however, requires separate steps for winding the coils, arranging the coils on the base, and assembling the base and the housing as a unit, adding to the cost of manufacturing a search loop assembly of that type.

What is needed then is a simply constructed housing for the search loop assembly of a metal detector, including a static charge dissipating shield which is not likely to be mechanically eroded during use, preferably having neutral buoyancy for underwater use, and, without being too heavy, having sufficient rigidity to resist mechanical deformation which might affect search loop performance.

SUMMARY OF THE INVENTION

The present invention answers the above-stated needs and overcomes the aforementioned disadvantages of previous metal detector search loop assembly housings, by providing a search loop assembly including a housing constructed of a moldable plastic material reinforced by included electrically conductive non-metallic fibers dispersed throughout. The mixture of conductive fibers and plastic dissipates static electricity charges before they can accumulate to a level great enough to affect metal detector performance to an unacceptable degree. Preferably, the fibers used are fine graphite fibers which also provide strength to the plastic material. It is suspected that enough of the fine fibers contact one another to provide electrical paths of moderate resistance conducting frictionally generated electrical charges away before they become great enough to be a problem to use of the metal detector.

It is therefore a principal object of the present invention to provide an improved housing in a metal detector search loop assembly.

It is another important object of the present invention to provide a housing of an electrically conductive material as a shield for preventing static electrical charges from accumulating without detrimentally affecting metal detector performance.

An important feature of the housing of the present invention is that it is made of plastic including fibers which provide greatly improved tensile strength, bending strength, and resistance to abrasion by comparison with the pure plastic material.

Another important feature of a preferred embodiment of the present invention is the provision of cylindrical walls, which may be included in one portion of the housing, preferably concentric with the perimeter of the housing, with each such wall being capable of serving as a spool. The transmit, receive and balance coils of a metal detector search loop assembly may be wound directly onto these spools, simplifying the manufacture of such a search loop assembly. After the winding is completed, the two halves of the housing are joined physically and interconnected electrically.

A further feature of the search loop housing of the present invention is that it is filled with a strengthening filling of plastic foam material expanded in place to help hold the coils in place securely to eliminate relative movement of the coils relative to one another and of the coils relative to the static-dissipating housing. The foam not only holds the coils in place, but adheres to the interior of the outer shell portions of the housing, adding to the overall strength and rigidity of the housing.

The density of the foam used may be chosen to control the density of the search loop assembly, to result, for example, in a search loop assembly having neutral buoyancy in fresh or sea water.

It is an important advantage of the metal detector search loop housing of the present invention that because it is made from fiber-reinforced plastic it can be made thinner, and therefore lighter, yet have the same or greater rigidity together with greater abrasion resistance than previous housings.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 1:
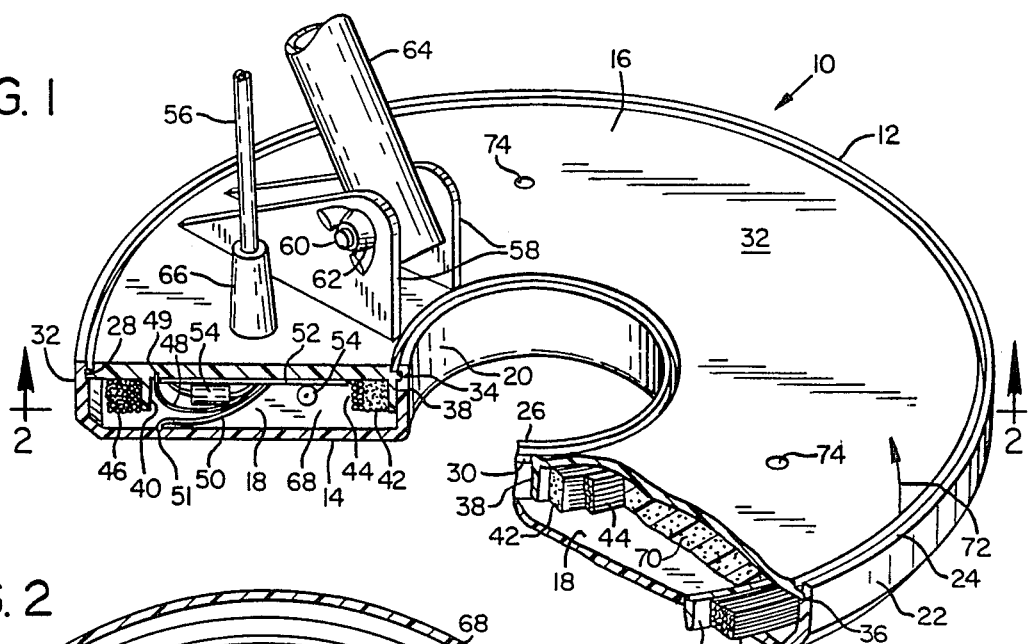
FIG. 1 is a partially cut-away perspective view of a search loop assembly including a housing according to the present invention.

Referring now to the drawings, a search loop assembly 10 includes a housing 12 according to the present invention.

The housing 12 includes a shell made as two portions, a lower housing portion 14 and an upper housing portion 16. Both the upper and lower portions 14 and 16 are constructed, preferably by molding, of a plastic material reinforced with a quantity of electrically conductive fibers, preferably graphite fibers, dispersed throughout the plastic resin material. The quantity of conductive fibers must be sufficient to provide conductive paths for the discharge of electrostatic charges, yet not so great as to decrease the electrical resistance of the housing 12 to the extent that significant eddy currents can be generated in the housing 12 response to operation of the metal detector, since such eddy currents would interfere with target detection and identification.

In this preferred embodiment of the invention, a suitable plastic, such as an ABS plastic, is reinforced with electrically conductive graphite fibers, a preferred concentration of the graphite fibers being about fifteen percent of the mixture by weight, providing a significant enhancement of the structural strength compared with unreinforced plastic. The graphite fibers used are quite long in relation to their diameters, and initially have a mean length of about $\frac{1}{4}''$ to $\frac{3}{8}''$, although the fiber lengths are decreased by the processes of mixing with the plastic and molding the housing parts, to a mean length thought to be about $\frac{1}{8}''$ to $3/16''$. Such fibers have a relatively very small diameter, on the order of 6 to 8 microns, giving a very high aspect ratio of length to diameter, by comparison to previously used amorphous carbon fibers. This aspect ratio is apparently of importance to the creation of a conductive network in the housing 12 for dissipation of static electrical charges. It is suspected that the fine fibers become dispersed throughout the plastic material, physically touching one another in such a way as to provide numerous interconnecting electrical paths of a moderate resistance. The material thus is able to conduct electricity well enough to prevent accumulation of troublesome charges on the search loop housing 12, but without conductivity of the housing being a problem in itself. Such fiber-reinforced plastic mixture is available in moldable pellet form from Thermofil, Inc., of Brighton, Mich., as stock number D-15NF-0100. It has been discovered through experimentation that for acceptable performance of a housing acting as a static shield for a metal detector search loop assembly the quantity of graphite fibers mixed with ABS plastic should preferably be at least about twelve percent by weight of the resultant mixture. Lesser quantities of graphite fibers appear not to provide consistently the conductivity required to dissipate electrostatic charges quickly enough to avoid interference with performance of the metal detector search loop. Mixtures containing more than fifteen percent graphite fibers by weight have performed satisfactorily and may have better mechanical strength, but greater graphite fiber content is not necessary for elimination of electrostatic charges from the housing 12. Another drawback of greater graphite fiber content is that it creates greater conductivity, making the housing more apparent to the metal detector as a factor in the receive coil signal. Tests have shown that the preferred material for use as a housing 12 according to the present invention has a volume resistivity of 3.00 Log 10 ohm cm$^2$/cm, and a housing 12 exhibits about 1,000 ohms between points on its surface separated by a distance of one inch, with fifteen percent concentration of graphite.

In addition to the required conductivity, the graphite fibers add strength to the plastic material. In the preferred fifteen percent by weight concentration of graphite fibers tensile strength of the reinforced plastic is about 14,000 psi, greater by a factor of about 3, flexural strength is about 19,000 psi, approximately double, and compressive strength of the reinforced plastic is about 14,500 psi, approximately double, that of the pure ABS plastic Additionally, resistance to abrasion is about twice as good in the graphite-fiber-reinforced plastic as in pure plastic.

The lower housing portion 14 includes a flat, annular bottom plate 18 having a central aperture and two concentric, upstanding annular walls, an inner wall 20 and an outer wall 22. Provided near the upper margin 24 of the outer wall 22 and upper margin 26 of the inner wall 20 are an inwardly facing retaining groove 28 and an outwardly facing retaining groove 30.

The upper housing portion 16, seen best in FIG. 1, includes an annular upper plate portion 32 for which the lower housing portion 14 serves as a cover. The inner and outer margins 34 and 36, respectively, of the upper plate 32 matingly engage the retaining grooves 30 and 28 of the lower housing portion 14 when the housing 12 is assembled, and may also be held in place by an adhesive (not depicted in the drawings). Projecting from the lower surface of the upper housing portion 16 are two concentric, annular walls which serve as spools for windings, an inner spool 38 and an outer spool 40, best seen in FIG. 3. The inner spool 38 supports windings of an electrical conductor of a receive coil 42, typically many turns of fine wire. A feedback coil 44 fits around the receive coil 42 and is typically a smaller number of turns of heavier wire. The outer spool 40 supports windings of a similar conductor of a transmit coil 46. The receive coil 42, feedback coil 44, and transmit coil 46 are preferably secured in place on their respective spools by adhesives. It will be understood that such spools might instead be provided as part of the lower housing 14, if desired.

Figure 2:
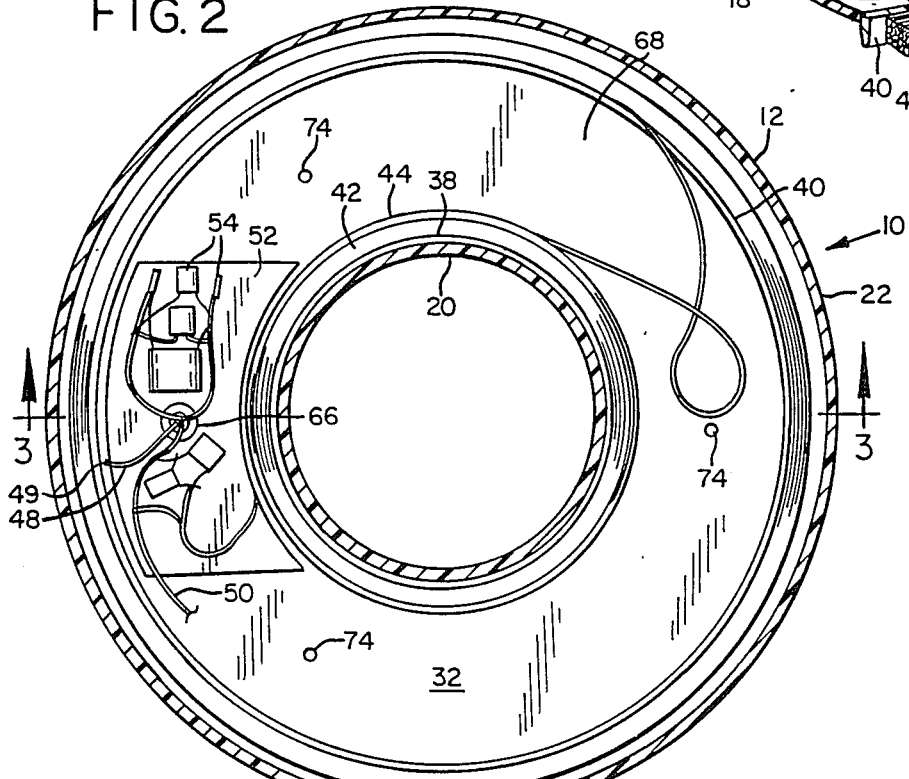
FIG. 2 is a bottom view, taken along line 2—2, of an upper portion of the search loop assembly shown in FIG. 1, without any foam filling.

An upper housing ground connection wire 48 is imbedded into the material of the top plate 32 near the outer spool 40 as shown in FIG. 2 at 49, as by use, for example, of a soldering iron to melt the plastic temporarily. Similarly, a lower housing connection wire 50 is imbedded into the material of the bottom plate 18 near the outer wall 22 at 51. A piece of electrically nonconductive paper 52 is fastened to the lower side of the top plate 22. Required electronic components 54 for tuning the coils 42, 44, and 46 are electrically connected respectively to each other and to the transmit, feedback and receive coils 46, 44, and 42 as required, and are fastened to the nonconductive paper 52 as by adhesives.

The nonconductive paper 52 prevents the conductive upper housing portion 16 from short-circuiting the electronic components 54. The upper housing connection wire 48 and the lower housing connection wire 50 are electrically connected to each other, thus electrically interconnecting the upper and lower housing portions 16 and 14.

An electrical cable 56 includes a conductor connected to the upper housing connection wire 48 to carry electrostatic charges away from the housing 12, for example, to the casing (not shown) of the metal detector electronics, package.

Projecting upwardly from the upper surface of the upper housing portion 16 are a pair of parallel attachment ears 58. A fastener such as a bolt 60, preferably provided with a wing nut 62, secures an end piece of a support arm 64 between the two attachment ears 58, so that a particular angle may be established between the support arm 64 and the housing 12, depending on the user's preference. Extending through the annular plate 32 near the two attachment ears 58 is a flex and strain relief fitting 66 through which the electrical cable 56 passes, to provide electrical connection between the search loop assembly 10 and the metal detector's main electronics package (not shown).

Figure 3:
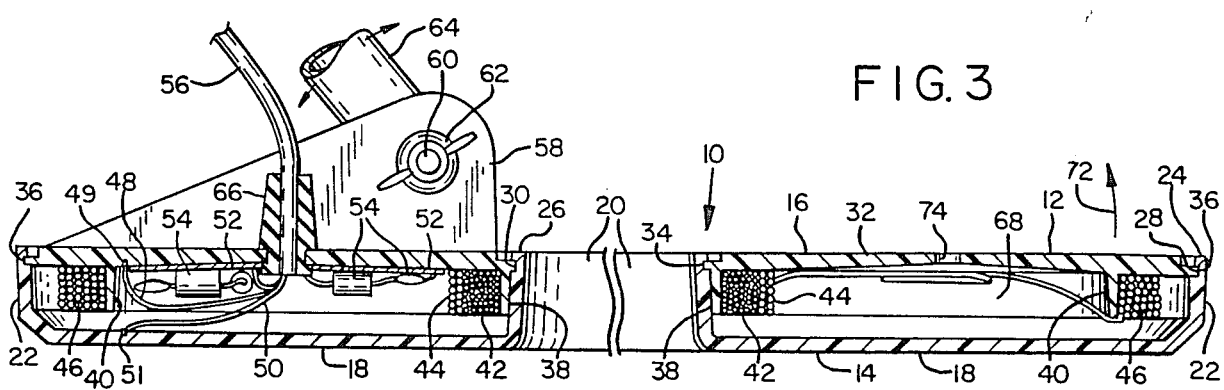
FIG. 3 is a partially cut-away sectional view, taken along line 3—3 of FIG. 2, of the search loop assembly shown in FIG. 1, without any foam filling.

When assembled as shown in FIGS. 1 and 3, the upper portion 16 and lower portion 14 of the housing 12 define an interior cavity 68 containing the transmit coil 46, balance coil 44, and receive coil 42, as well as the electronic components 54. The interior cavity 68 of the housing 12 is filled with a plastic resin foam 70, formed in place and adhering to the interior surfaces of the cavity 68 and thereby strengthening the search loop assembly 10 and more securely fixing the coils 42, 44, and 46 in place. For typical metal detection purposes, a foam having a density of four pounds per cubic foot when cured is used, providing a search loop assembly 10 which is light in weight and thus not too tiring to use.

For underwater use, however, a search loop assembly 10 having/neutral buoyancy is desired. If the assembly is too light an upward force represented by arrow 72 in FIG. 1 tends to lift the search loop assembly 10 upwards, making effective metal detection more difficult. Neutral buoyancy may be obtained by using a foam 70 having a greater density, so that the complete search loop assembly 10 has the same mass as the equivalent volume of water. Different densities would be preferred for fresh water and ocean water searching.

A search loop assembly 10 may be constructed according to the present invention as follows. First, the upper and lower housing portions 16 and 14 are formed by injection molding a selected plastic material containing dispersed electrically conductive non-metallic fibers, as described above. After proper trimming away of mold flash and the like the upper housing portion 16 is placed on a winding machine which winds the transmit coil 46 directly on the outer spool 40. The receive coil 42 may also be wound directly on the inner spool 38, with the feedback coil 44 thereafter being wound about the receive coil 42. The coils 42, 44, and 46 might also be wound on separate spools of the winding machine and transferred to the spool 38 and 40, is that is desired because of the characteristics of the wire used or the equipment available, although it is considered preferable to wind the coils directly on the spools 38 and 40, in order to reduce labor.

The upper housing portion 16 is placed over the lower housing portion 14 and snapped into place, with the inner and outer margins 34 and 36 engaged in the grooves 30 and 28, respectively. A two-part, foam-forming plastic resin mixture is prepared in proper proportions to form foam of a desired density, and an appropriate quantity of the mixture is forced into the lower housing portion 14. The foam 70 expands and cures, with the excess escaping through the relief holes 74. The excess foam is trimmed from around the relief holes 74 of the upper housing portion 16, and the seams between the upper and lower housing portions 14 and 16, along the grooves 28 and 30, are glued, sealing the search loop assembly. A label may then be placed over the upper housing portion 16, concealing the relief holes 74.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A housing for a metal detector search loop assembly including a transmit coil and a receive coil magnetically coupled therewith, the housing comprising:
   (a) a shell defining a cavity, said shell being constructed of a plastic material including a predetermined concentration of non-metallic electrically conductive fibers distributed throughout said plastic material, said concentration of said conductive fibers in said plastic material being at least sufficient to provide conductive paths having the ability to dissipate electrostatic charges; and
   (b) coil mounting means included in said housing for supporting said transmit coil and said receive coil in a fixed spatial relationship within said cavity.

2. The housing of claim 1 wherein said conductive fibers are of graphite.

3. The housing of claim 2 wherein said concentration of said graphite fibers is at least about twelve percent by weight.

4. The housing of claim 3 wherein said concentration of said graphite fibers is about fifteen percent by weight.

5. The housing of claim 1 wherein said fibers have a length-to-diameter aspect ratio of at least about 150:1.

6. The housing of claim 1 wherein said conductive fibers are, strong enough and are included in said plastic material in a quantity sufficient to increase the strength of said plastic material significantly.

7. A housing for containing and supporting a plurality of conductor coil windings of a search loop assembly of a portable metal detector, comprising:
   (a) an upper portion;
   (b) a lower portion; one of said upper portion and said lower portion defining a first spool for supporting a first coil winding of said plurality; and said lower portion fitting matingly to said upper portion;
   (c) said upper portion and lower portion when fitted matingly together defining a cavity for enclosing said plurality of conductor coil windings;
   (d) an electrical conductor electrically connected to said housing; and
   (e) said upper and lower portions being of a plastic material including a predetermined quantity of non-metallic electrically conductive fibers dispersed substantially throughout said plastic material, causing said housing to have sufficient electrical conductivity to prevent accumulation of a static electrical charge to a level great enough to interfere with metal detector performance, by conduction from said upper and lower portions to said electrical conductor.

8. The housing of claim 7, said one of said upper portion and said lower portion defining a second spool for supporting a second coil winding of said plurality.

9. The housing of claim 8 wherein said second spool is concentric with said first spool.

10. The housing of claim 7 wherein said cavity is filled with a foam plastic surrounding and fastening said plurality of conductor coil windings.

11. The housing of claim 9 wherein said foam plastic is of a predetermined density resulting in substantially neutral buoyancy of said search loop assembly in water.

12. The housing of claim 7 wherein said first spool is defined by said upper portion.

* * * * *

UNITED STATES PATENT AND TRADEMARK OFFICE
CERTIFICATE OF CORRECTION

PATENT NO.   : 4,862,316
DATED        : August 29, 1989
INVENTOR(S)  : Peter T. Smith et al.

It is certified that error appears in the above-identified patent and that said Letters Patent is hereby corrected as shown below:

| | | |
|---|---|---|
| Col. 2, | Line 1  | Change "sue" to --use--. |
| Col. 5, | Line 24 | After "plastic" insert --.--. |
| Col. 6, | Line 12 | Change "electronics," to --electronics--; |
|         | Line 40 | Change "having/neutral" to --having neutral--; |
|         | Line 62 | Change "is" (first occurrence) to --if--. |
| Col. 8, | Line 6  | Change "are," (first occurrence) to --are--; |
|         | Line 40 | Change "claim 9" to --claim 10--. |

Signed and Sealed this

Twenty-sixth Day of November, 1991

*Attest:*

HARRY F. MANBECK, JR.

*Attesting Officer*     *Commissioner of Patents and Trademarks*